US012763446B2

(12) United States Patent
Xu et al.

(10) Patent No.: US 12,763,446 B2
(45) Date of Patent: Oct. 13, 2026

(54) FILTER, PHASE SHIFTER, AND RELATED APPARATUS

(71) Applicant: Huawei Technologies Co., Ltd., Shenzhen (CN)

(72) Inventors: Chunliang Xu, Xi'an (CN); Jiejun Zhou, Xi'an (CN); Xinming Liu, Xi'an (CN); Junfeng Lu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 836 days.

(21) Appl. No.: 17/848,137

(22) Filed: Jun. 23, 2022

(65) Prior Publication Data

US 2022/0359965 A1 Nov. 10, 2022

Related U.S. Application Data

(63) Continuation of application No. PCT/CN2020/138866, filed on Dec. 24, 2020.

(30) Foreign Application Priority Data

Dec. 24, 2019 (CN) ......................... 201911351077.2

(51) Int. Cl.
*H01P 1/20* (2006.01)
*H01P 3/06* (2006.01)
(Continued)

(52) U.S. Cl.
CPC .................. *H01P 1/20* (2013.01); *H01P 3/06* (2013.01); *H01P 3/08* (2013.01); *H01P 5/12* (2013.01); *H04B 1/40* (2013.01)

(58) Field of Classification Search
CPC ...... H01P 1/20; H01P 3/06; H01P 3/08; H01P 5/12; H04B 1/40
See application file for complete search history.

(56) References Cited

U.S. PATENT DOCUMENTS

2017/0005387 A1 1/2017 Hsu et al.
2017/0012336 A1* 1/2017 Liu ......................... H01P 1/207
2018/0123240 A1* 5/2018 Liao .......................... H01P 1/18

FOREIGN PATENT DOCUMENTS

CN 102176525 A * 9/2011
CN 103311621 A 9/2013
(Continued)

OTHER PUBLICATIONS

Liu Jinyuan et al., "Design of S Band Power Divider with Phase Shifter," Proceedings of the 2015 National Microwave and Millimeter Wave Conference, pp. 732-735 (May 30, 2015). With an English Abstract.

*Primary Examiner* — Muthuswamy G Manoharan
(74) *Attorney, Agent, or Firm* — Leydig, Voit & Mayer, Ltd.

(57) ABSTRACT

A filter comprising a cavity, a circuit board located in the cavity, and a filter branch is provided. A power divider circuit is disposed on the circuit board, and includes an input end, a main feeder, and an output end, wherein both the input end and the output end are electrically connected to the main feeder, and the main feeder transmits a signal that is input at the input end and is output at the output end. The filter branch includes a first interface and a first filter line, wherein the first interface is disposed at an opening of the cavity, the first filter line is located outside the cavity, the first filter line is electrically connected to the first interface, and the first interface is electrically connected to the main feeder. The first filter line in the filter branch is disposed outside the cavity.

20 Claims, 3 Drawing Sheets

(51) Int. Cl.
*H01P 3/08* (2006.01)
*H01P 5/12* (2006.01)
*H04B 1/40* (2015.01)

(56) References Cited

FOREIGN PATENT DOCUMENTS

| | | | | | |
|---|---|---|---|---|---|
| CN | 106654494 | A | * | 5/2017 | ................ H01P 1/18 |
| CN | 206211031 | U | | 5/2017 | |
| CN | 106921011 | A | | 7/2017 | |
| CN | 108682939 | A | | 10/2018 | |
| CN | 109088133 | A | | 12/2018 | |
| CN | 109638391 | A | | 4/2019 | |
| CN | 209133655 | U | | 7/2019 | |
| CN | 108598638 | B | | 10/2019 | |
| CN | 209487674 | U | | 10/2019 | |
| CN | 209487715 | U | | 10/2019 | |
| CN | 110752423 | A | * | 2/2020 | |
| CN | 107710499 | B | | 7/2020 | |
| CN | 109088133 | B | * | 10/2023 | ................ H01P 1/18 |
| KR | 101246934 | B1 | | 3/2013 | |
| WO | 2016205995 | A1 | | 12/2016 | |
| WO | 2019071847 | A1 | | 4/2019 | |

* cited by examiner

FILTER, PHASE SHIFTER, AND RELATED APPARATUS

CROSS-REFERENCE TO RELATED APPLICATIONS

This application is a continuation of International Application No. PCT/CN2020/138866, filed on Dec. 24, 2020, which claims priority to Chinese Patent Application No. 201911351077.2, filed on Dec. 24, 2019. The disclosures of the aforementioned applications are hereby incorporated by reference in their entireties.

TECHNICAL FIELD

Embodiments of this application relate to the field of communication technologies, and in particular, to a filter, a phase shifter, and a related apparatus.

BACKGROUND

In a mobile communications system, due to requirements of network coverage or network optimization, a beam direction of a base station antenna on a pitch plane needs to be adjusted. For example, a beam on the pitch plane may be adjusted by using an adjustable phase shifter. A working principle of the adjustable phase shifter is to adjust a downtilt of the beam of the antenna by changing phase distribution of each antenna element in the array antenna. In this way, not only a main beam direction can be continuously adjusted, but also a beam on a horizontal plane can be ensured not to be deformed. There are mainly two types of adjustable phase shifters: a dielectric phase shifter and a physical phase shifter. The dielectric phase shifter implements a phase shift by changing a waveguide wavelength, and the physical phase shifter implements a phase shift by changing a length of a transmission path of an electromagnetic wave. However, as a quantity of remote electrical tilt antennas increases, a filter needs to be added at a front end of a phase shifter, to ensure that frequency bands do not interfere with each other, which increases inter-frequency isolation. An independent filter is usually added between a base station antenna and a phase shifter. In this solution, the base station antenna and the filter, and the filter and the phase shifter are connected through a cable. In this multi-level cascading solution, a connection needs to be performed by using a screw or a welding point, which increases a risk of passive inter modulation (PIM) and affects communication quality.

Based on this, in a current general design solution, a filter is integrated in a phase shifter (cavity), to simplify cascading. The filter includes a filter branch, and the filter branch is configured to filter out an electromagnetic wave.

Generally, to adjust a wavelength range of an electromagnetic wave filtered out by a filter, a length of a filter branch needs to be adjusted. However, in the foregoing design solution, because the filter is integrated in the phase shifter cavity, there are difficulties in adjustment.

SUMMARY

Embodiments of this application provide a filter. A first filter line in a filter branch is disposed outside a cavity. Therefore, a user may adjust a length of the first filter line outside the cavity, to adjust a wavelength range of an electromagnetic wave filtered out by the filter. This improves user convenience.

According to a first aspect, an embodiment of this application provides a filter. The filter includes: a cavity, a circuit board, and a filter branch. The circuit board is located in the cavity. A power divider circuit is disposed on the circuit board, and the power divider circuit includes an input end, a main feeder, and an output end, where the input end is electrically connected to the main feeder, the output end is electrically connected to the main feeder, and the main feeder is configured to transmit a signal that is input at the input end to the output end. The filter branch includes a first interface and a first filter line, where the first interface is disposed at an opening of the cavity, the first filter line is located outside the cavity, the first filter line is electrically connected to the first interface, and the first interface is electrically connected to the main feeder.

In this embodiment of this application, the first filter line, a part of the filter branch, is disposed outside the cavity, and the first interface, a part of the filter branch, is disposed at the opening of the cavity. The first filter line is electrically connected to the first interface, the first interface is electrically connected to the main feeder, and the first filter line is electrically connected to the main feeder through the first interface. A user may adjust a length of the first filter line outside the cavity, to adjust a wavelength range of an electromagnetic wave filtered out by the filter. This improves user convenience.

With reference to the first aspect, in some implementations, the first filter line is electrically connected to the first interface in a welding mode, or the first filter line is electrically connected to the first interface in a screwing mode, or the first filter line is electrically connected to the first interface in a coupling mode. The first filter line can be electrically connected to the first interface in a plurality of modes, which improves implementation flexibility of this solution.

With reference to the first aspect, in some implementations, the first filter line is a coaxial cable or a metal strip line. A function of the first filter line can be implemented by using a plurality of components such as a coaxial cable and a metal strip line, thereby improving implementation flexibility of this solution.

With reference to the first aspect, in some implementations, the filter branch further includes a second filter line. The second filter line is located in the cavity, the second filter line is disposed on the circuit board, and the first interface is connected to the main feeder through the second filter line. A total length of the first filter line and the second filter line ranges from 1/16 to 3/4 of a wavelength, and the wavelength is a wavelength of an electromagnetic wave filtered out by the filter branch. The second filter line in the filter branch is disposed in the cavity, which improves space utilization in the cavity.

With reference to the first aspect, in some implementations, the circuit board includes a metal strip line, where the metal strip line is exposed to air, or the metal strip line is a metal layer electroplated on a surface of a substrate, or the metal strip line is a metal layer embedded on the surface of the substrate, and the substrate is plastic or ceramic. The circuit board can be implemented in a plurality of modes, which improves implementation flexibility of this solution.

With reference to the first aspect, in some implementations, at least one buckle is disposed in the cavity; at least one through hole is disposed in the circuit board; and the through hole limits the buckle. The circuit board is fastened in the cavity through cooperation between the through hole and the buckle. For the at least one buckle disposed in the cavity and the at least one through hole disposed in the circuit board, the through hole limits the buckle. The circuit board is fastened in the cavity through cooperation between the buckle and the through hole. This improves stability of an internal structure of the filter.

With reference to the first aspect, in some implementations, a first end cover and a second end cover are respectively disposed at two opposite ends of the cavity. A first slot and a second slot are respectively disposed at two ends that are of the circuit board and that correspond to the cavity, where the first slot limits the first end cover, and the second slot limits the second end cover. The circuit board is fastened in the cavity through cooperation between the first slot and the first end cover and cooperation between the second slot and the second end cover. This improves stability of the internal structure of the filter.

With reference to the first aspect, in some implementations, the filter further includes a fastener. The fastener is perpendicular to the circuit board. Two ends of the fastener are connected to the cavity in a vertical direction relative to the circuit board, and the fastener is configured to limit the circuit board in the vertical direction relative to the circuit board. This improves stability of the internal structure of the filter.

According to a second aspect, an embodiment of this application further provides a phase shifter. The phase shifter includes the filter according to the foregoing first aspect and any one of the implementations in the first aspect, where the phase shifter further includes a phase shift unit. The phase shift unit is located in a cavity, and the phase shift unit can move relative to a circuit board. The phase shift unit includes a mobile circuit board, the mobile circuit board is disposed in parallel on a side of the circuit board, and the mobile circuit board is coupled and electrically connected to the circuit board.

In this embodiment of this application, the filter is integrated into the phase shifter. A first filter line in a filter branch is disposed outside the cavity. Therefore, a user may adjust a length of the first filter line outside the cavity, to adjust a wavelength range of an electromagnetic wave filtered out by the filter. This improves user convenience. Because a relatively large part (the first filter line) of the filter branch is disposed outside the cavity of the phase shifter, compared with a phase shifter in the conventional technology, the phase shifter can save large space in the cavity, to improve electromagnetic performance of the phase shifter. In addition, a performance requirement of the phase shifter can be met based on a smaller size of the phase shifter. The circuit board can be stably fastened in the cavity through cooperation between a through hole and a buckle, cooperation between a slot and an end cover, and a fastener, to ensure stability of a structure of the phase shifter.

According to a third aspect, an embodiment of this application further provides an antenna. The antenna includes: an antenna unit, configured to radiate an electromagnetic beam, and the phase shifter that is connected to the antenna unit and that is according to the foregoing second aspect. The phase shifter is configured to adjust an angle of the electromagnetic beam radiated by the antenna unit.

According to a fourth aspect, an embodiment of this application further provides a multi-band antenna network system. The multi-band antenna network system includes the antenna according to the foregoing third aspect.

According to a fifth aspect, an embodiment of this application further provides a base station device. The base station device includes the antenna according to the foregoing third aspect.

For technical effects brought by any one of the possible implementations of the third aspect to the fifth aspect, refer to technical effects brought by the first aspect, the different possible implementations of the first aspect, or the implementations of the second aspect. Details are not described herein again.

It can be learned from the foregoing technical solutions that embodiments of this application have the following advantages.

A filter branch includes a first interface and a first filter line, where the first interface is disposed at an opening of a cavity, the first filter line is located outside the cavity, the first filter line is electrically connected to the first interface, and the first interface is electrically connected to a main feeder. Because a part (the first filter line) of the filter branch is disposed outside the cavity, a user may adjust a length of the first filter line outside the cavity, to adjust a wavelength range of an electromagnetic wave filtered out by a filter. This improves user convenience.

DESCRIPTION OF EMBODIMENTS

Embodiments of this application provide a filter, a phase shifter, and a related apparatus. The filter includes a cavity and a filter branch. The filter branch includes a first interface and a first filter line, where the first interface is disposed at an opening of the cavity, the first filter line is located outside the cavity, the first filter line is electrically connected to the first interface, and the first interface is electrically connected to a main feeder. The first filter line is in an open-circuit state. Because a part (the first filter line) of the filter branch is disposed outside the cavity, a user may adjust a length of the first filter line outside the cavity, to adjust a wavelength range of an electromagnetic wave filtered out by the filter. This improves user convenience.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a distinguishing manner used when objects having a same attribute are described in embodiments of this application. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
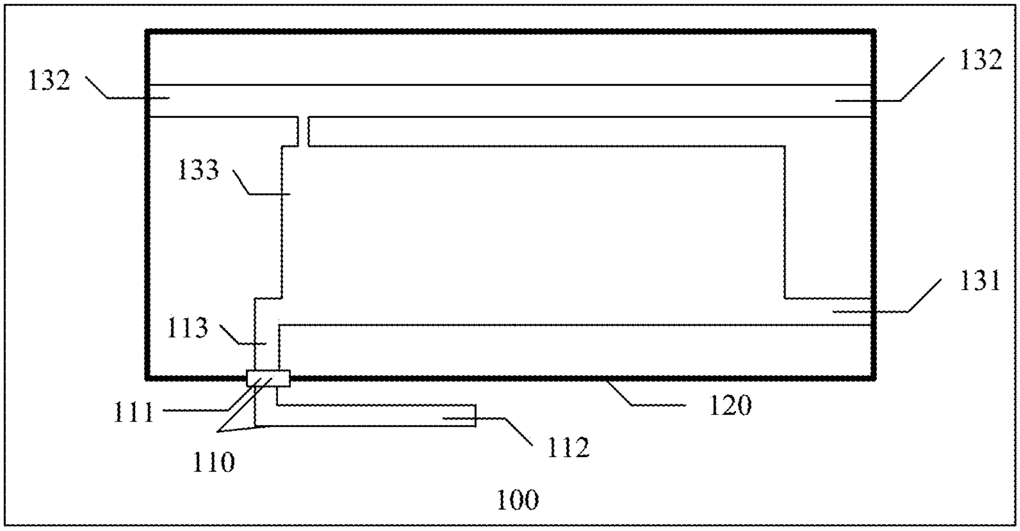
FIG. 1 is a schematic diagram of a structure of a filter according to an embodiment of this application.

FIG. 1 is a schematic diagram of a structure of a filter according to an embodiment of this application. An embodiment of this application provides a filter 100. The filter 100 includes a filter branch 110, a cavity 120, and a circuit board. The circuit board is located in the cavity 120, and a power divider circuit is disposed on the circuit board. The power divider circuit divides an input signal (energy) into two or more output signals (energy). The output signals (energy) may be equal signals (energy) or unequal signals (energy). The power divider circuit disposed on the circuit board in the filter 100 is described by using one input end 131 and two output ends 132 as an example. The input end 131 is electrically connected to the output ends 132 through a main feeder 133. The main feeder 133 is configured to transmit a signal (energy) input at the input end 131 to the output ends 132. It should be noted that, the filter 100 may further include more or fewer output ends 133. This is not limited herein. For example, the power divider circuit includes only one output end and one input end. The circuit board includes a metal strip line, where the metal strip line is exposed to air, or the metal strip line is a metal layer electroplated on a surface of a substrate, or the metal strip line is a metal layer embedded on the surface of the substrate, and the substrate is plastic or ceramic. The metal strip line may be specifically a microstrip line.

Optionally, the circuit board may not use a substrate, and may include only a metal strip line.

The filter branch 110 includes a first interface 111 and a first filter line 112. The first interface 111 is disposed at an opening of the cavity 120, the first interface 111 is electrically connected to the main feeder 133, and the first interface 111 is electrically connected to the first filter line 112. The first filter line 112 is disposed outside the cavity 120. It should be noted that, the first interface 111 may be a physical interface, or may be an overlapping part between an electrical connection part between the first filter line 112 and the main feeder 133 and the opening of the cavity 120. In other words, the first interface 111 may alternatively be a part of the first filter line 112 (or the main feeder 133). This is not limited herein. The first filter line 112 is in an open-circuit state (in other words, relative to one end connected to the first interface 111, the other end of the first filter line 112 is not connected to any circuit).

The first filter line 112 may be connected to the first interface 111 in a plurality of modes. For example, the first filter line 112 is electrically connected to the first interface 111 in a welding mode, and the welding mode specifically includes tin welding. The first filter line 112 is electrically connected to the first interface in a screwing mode. For example, an end that is of the first filter line 112 and that is electrically connected to the first interface 111 is of a screw structure, and an end that is of the first interface 111 and that is electrically connected to the first filter line 112 is of a nut structure. The first filter line 112 may also be electrically connected to the first interface 111 in a coupling mode. In other words, the first filter lines 112 and the first interface 111 are spaced and not in direct contact with each other, to form an electrical coupling structure. The first filter line 112 can conduct electricity, and may be specifically a coaxial cable or a metal strip line.

The filter branch 110 is configured to filter out a part of an electromagnetic wave transmitted by the main feeder 133. A user may adjust a length of the first filter line 112, to adjust a wavelength range of the electromagnetic wave filtered out. For example, the user may cut off a part of the first filter line 112, to reduce the length of the first filter line 112. Alternatively, on the basis of the original first filter line 112, relative to the end connected to the first interface 111, a conducting wire is welded on the other end of the first filter line 112. The conducting wire is electrically connected to the first filter line 112, and the welded conducting wire and the original first filter line 112 compose a new first filter line 112. The conducting wire may be made of a same material as the first filter line 112. For example, when the first filter line 112 is a coaxial cable, the conducting wire is a coaxial cable. The conducting wire may alternatively be made of a different material from the first filter line 112. For example, when the first filter line 112 is a coaxial cable, the conducting wire is a metal strip line. When the first interface 111 is a physical interface, the user may alternatively replace the first filter line 112 with another first filter line 112 of a different length, where the another first filter line 112 is connected to the first interface 111, to adjust the wavelength range of the electromagnetic wave filtered out.

Optionally, in the filter branch 110, a part of the filter line may be disposed in the cavity 120. The filter line is referred to as a second filter line 113. The first interface 111 is electrically connected to the main feeder 133 through the second filter line 113. A total length of the first filter line 112 and the second filter 113 line ranges from 1/16 to 3/4 of a wavelength, and the wavelength is a wavelength of an electromagnetic wave filtered out by the filter branch 110. The total length of the first filter line 112 and the second filter line 113 specifically refers to a total length of a path from the end that is of the first filter line 112 and that is in an open-circuit state to a position at which the second filter line 113 and the main feeder 133 are connected. The second filter line 113 can conduct electricity, and may be specifically a coaxial cable or a metal strip line.

For example, when the filter 100 is in an initial state, a total length of the filter branch 110 (that is, the total length of the first filter line 112 and the second filter line 113) is 70 millimeters. During actual use, the user requires that the filter 100 should be applicable to an 850 mega hertz (MHz) filtering scenario. It can be learned through calculation that, in the 850 MHz filtering scenario, the total length of the filter branch 110 is required to be 60 millimeters. A length of the second filter line 113 is 30 millimeters, and a length of the first filter line 112 is 40 millimeters. Therefore, the user may reduce the length of the first filter line 112 located outside the cavity 120, to adjust the total length of the filter branch 110 to 60 millimeters. In this way, the filter 100 can be successfully applicable to the 850 MHz filtering scenario. In addition, the user may further monitor, by using a vector network analyzer, a waveform of an electromagnetic wave filtered out by the filter 100, and adjust the length of the first filter line 112. The length of the first filter line 112 is adjusted, to adjust the wavelength range of the electromagnetic wave filtered out by the filter. It should be noted that, the foregoing filter branch 110 and the wavelength of the electromagnetic wave filtered out are merely examples for description. This is not limited herein.

In this embodiment of this application, a filter is described. The filter may be applied to a plurality of passive components, for example, a phase shifter or a power divider. The filter includes a cavity and a filter branch. The filter branch includes a first interface and a first filter line, where the first interface is disposed at an opening of the cavity, the first filter line is located outside the cavity, the first filter line is electrically connected to the first interface, and the first interface is electrically connected to a main feeder. The first filter line may be specifically a coaxial cable or a metal strip line, and implements a filtering function at lower costs. For example, the first filter line is a coaxial cable. The coaxial cable is convenient for a user to adjust a length. For example, when the user needs to increase a length of the first filter line, another coaxial cable may be welded by the user at an end of the first filter line in a tin welding mode or the like, which increases the length of the first filter line. Alternatively, the user may cut off the first filter line through a plier, to reduce the length of the first filter line. The first filter line is disposed outside the cavity. Therefore, the user may adjust the length of the first filter line outside the cavity, to adjust a wavelength range of an electromagnetic wave filtered out by the filter. This improves user convenience.

Figure 2:
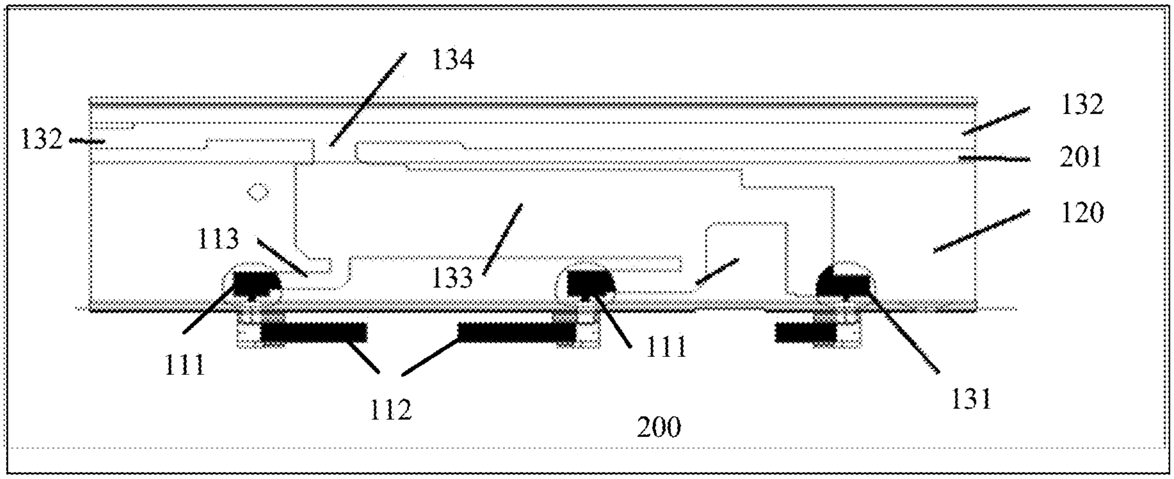
FIG. 2 is a schematic diagram of a phase shifter according to an embodiment of this application.

Next, on the basis of the filter 100 described in the foregoing embodiment, a phase shifter 200 provided in embodiments of this application is introduced. FIG. 2 is a schematic diagram of a phase shifter according to an embodiment of this application.

The phase shifter 200 includes the filter 100 and a phase shift unit. The phase shift unit includes a mobile circuit board 201. The mobile circuit board 201 includes a sliding medium, a motor (not shown in the figure) that drives the sliding medium, and a related wire chip (not shown in the figure) that controls the motor. The mobile circuit board is coupled and electrically connected to a circuit board in the filter 100. A relative position between the mobile circuit board and the circuit board changes, so that the phase shift unit shifts a phase of a signal. It should be noted that, the phase shifter 200 shown in FIG. 2 is merely an optional implementation. The filter provided in this application may be further applied to a plurality of different phase shifters such as a physical phase shifter. This is not limited herein.

The phase shifter 200 further includes one input end 131 and two output ends 132. The input end 131 is electrically connected to the output ends 132 through the main feeder 133. After a signal is input from the input end 131 to the main feeder 133, the signal is divided into two parts after passing through a T-shaped junction 134, and the two parts are transmitted to the separate output ends 132. The phase shifter 200 further includes two filter branches. Each filter branch includes the first filter line 112 and the first interface 111. The first filter line 112 is electrically connected to the main feeder 133 through the first interface.

The mobile circuit board 201 is disposed in parallel on both sides (or one side) of a circuit board 130, and the mobile circuit board 201 is coupled and electrically connected to the circuit board 130.

In this embodiment of this application, the filter is integrated into the phase shifter. A first filter line in a filter branch is disposed outside the cavity. Therefore, a user may adjust a length of the first filter line outside the cavity, to adjust a wavelength range of an electromagnetic wave filtered out by the filter. This improves user convenience. Because a relatively large part (the first filter line) of the filter branch is disposed outside the cavity of the phase shifter, compared with a phase shifter in the conventional technology, the phase shifter can save large space in the cavity, to improve electromagnetic performance of the phase shifter. In addition, a performance requirement of the phase shifter can be met based on a smaller size of the phase shifter.

Figure 3A:
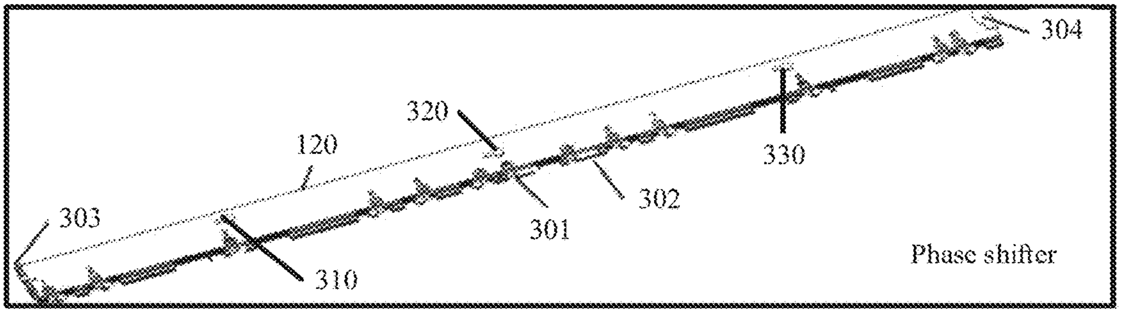
FIG. 3*a* is a schematic diagram of an appearance of a phase shifter according to an embodiment of this application.
Figure 3B:
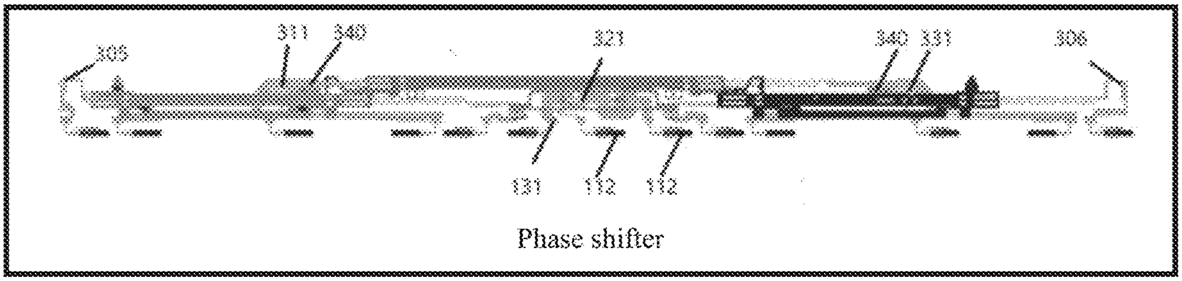
FIG. 3*b* is a schematic cross-sectional diagram of a phase shifter according to an embodiment of this application.

On the basis of the embodiments corresponding to FIG. 1 and FIG. 2, the following describes the phase shifter provided in this application with reference to FIG. 3*a* and FIG. 3*b*. FIG. 3*a* is a schematic diagram of an appearance of a phase shifter according to an embodiment of this application, and FIG. 3*b* is a schematic cross-sectional diagram of a phase shifter according to an embodiment of this application.

As shown in FIG. 3*a* and FIG. 3*b*, two openings are disposed on the cavity 120 of the phase shifter 200, and the two openings are respectively a first opening 301 and a second opening 302. One first interface 111 is disposed at each of the first opening 301 and the second opening 302, and the first interface 111 is electrically connected to the first filter line 112. A first buckle 310, a second buckle 320, and a third buckle 330 are disposed in the cavity 120. A first end cover 303 and a second end cover 304 are respectively disposed at two opposite ends of the cavity 120.

A first through hole 311, a second through hole 321, and a third through hole 331 are disposed in the circuit board 130. The first through hole 311 limits the first buckle 310, the second through hole 321 limits the second buckle 320, and the third through hole 331 limits the third buckle 330. The circuit board 130 is fastened in the cavity 120 through cooperation between the foregoing through holes and the foregoing buckles.

A first slot 305 and a second slot 306 are respectively disposed at two ends that are of the circuit board 130 and that correspond to the cavity 120. The first slot 305 limits the first end cover 303, and the second slot 306 limits the second end cover 304. The circuit board 130 is fastened in the cavity 120 through cooperation between the first slot 305 and the first end cover 303 and cooperation between the second slot 306 and the second end cover 304.

The phase shifter 200 further includes a fastener 340. The fastener 340 is perpendicular to the circuit board 130. Two ends of the fastener 340 are connected to the cavity in a vertical direction relative to the circuit board 130, and the fastener 340 is configured to limit the circuit board 130 in the vertical direction relative to the circuit board 130.

Figure 4:
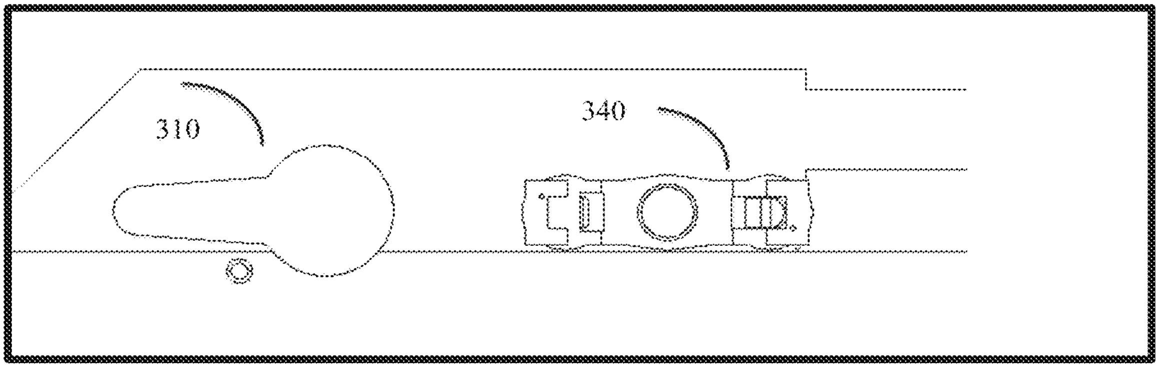
FIG. 4 is a schematic partial diagram of a structure of a phase shifter according to an embodiment of this application.
Figure 5:
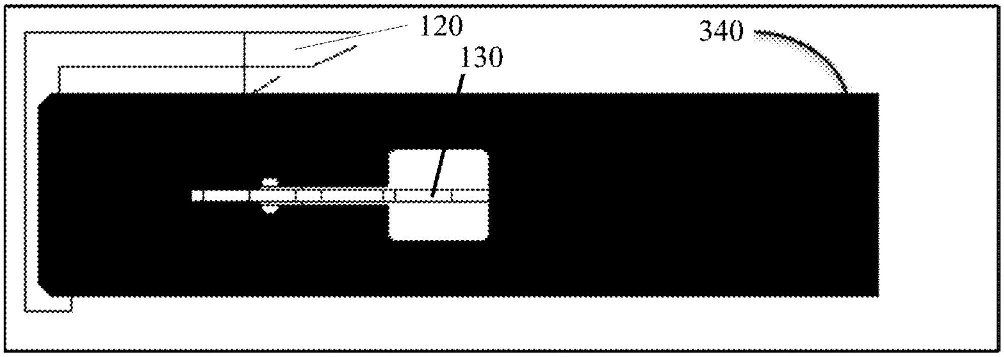
FIG. 5 is a schematic partial diagram of a structure of a phase shifter according to an embodiment of this application.

For ease of understanding, for a schematic partial diagram of the buckle (for example, the first buckle 310) and the fastener 340, refer to FIG. 4. FIG. 4 is a schematic partial diagram of a structure of a phase shifter according to an embodiment of this application. For a position of the fastener 340 relative to the circuit board 130, refer to FIG. 5. FIG. 5 is a schematic partial diagram of a structure of a phase shifter according to an embodiment of this application.

In this embodiment of this application, the filter is integrated into the phase shifter. A first filter line in a filter branch is disposed outside the cavity. Therefore, a user may adjust a length of the first filter line outside the cavity, to adjust a wavelength range of an electromagnetic wave filtered out by the filter. This improves user convenience. Because a relatively large part (the first filter line) of the filter branch is disposed outside the cavity of the phase shifter, compared with a phase shifter in the conventional technology, the phase shifter can save large space in the cavity, to improve electromagnetic performance of the phase shifter. In addition, a performance requirement of the phase shifter can be met based on a smaller size of the phase shifter. The circuit board can be stably fastened in the cavity through cooperation between a through hole and a buckle, cooperation between a slot and an end cover, and a fastener, to ensure stability of a structure of the phase shifter.

This application further provides an antenna. The antenna includes an antenna unit and the phase shifter described in the foregoing embodiments corresponding to FIG. 2 to FIG. 5. The antenna unit is configured to radiate an electromagnetic beam. The phase shifter is configured to adjust an angle of the electromagnetic beam radiated by the antenna unit. Specifically, an output end of the phase shifter is connected to the antenna unit through an output cable. A required signal current intensity and phase may be fed to the antenna unit through operation of the phase shifter, to change a direction of a radiation pattern of an array antenna.

This application further provides a multi-band antenna network system. The multi-band antenna network system includes any one of the foregoing phase shifters.

The filter, the phase shifter, the antenna, and/or the multi-band antenna network system provided in this application may be further applied to a base station (BS) device, which may alternatively be referred to as a base station and is an apparatus deployed in a radio access network to provide a wireless communication function. For example, in a 2G network, a device providing a base station function includes a base transceiver station (BTS) and a base station controller (BSC); in a 3G network, a device providing a base station function includes a NodeB and a radio network controller (RNC); in a 4G network, a device providing a base station function includes an evolved NodeB (eNB); and in a wireless local area network (WLAN), a device providing a base station function is an access point (AP). In a 5G communications system, a device providing a base station function includes an eNB, a new radio NodeB (gNB), a centralized unit (CU), a distributed unit, a new radio controller, and the like.

Figure 6:
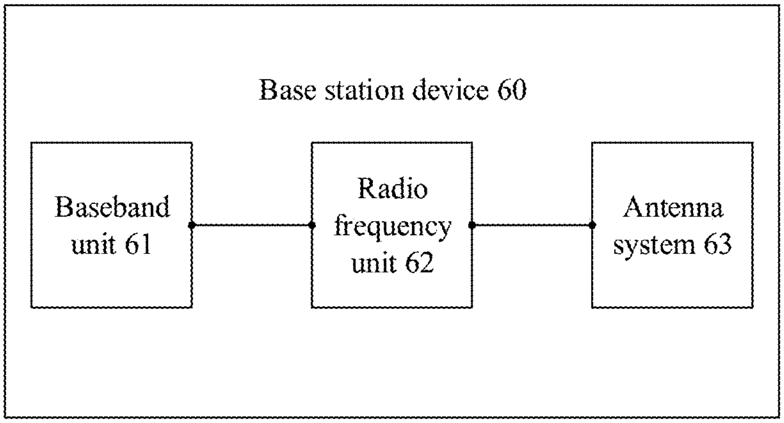
FIG. 6 is a schematic diagram of a structure of a base station device according to an embodiment of this application.

Optionally, a hardware structure of the base station device is shown in FIG. 6. A base station device 60 includes a baseband unit 61, a radio frequency unit 62, and an antenna system 63, where the radio frequency unit 62 is separately connected to the baseband unit 61 and the antenna system 63. For example, the baseband unit 61 may be a remote radio unit (RRU) and/or a building baseband unit (BBU). The radio frequency unit 62 includes at least one signal transceiver channel, and each signal transceiver channel processes a radio frequency signal stream. The signal transceiver channel includes a digital up converter (DUC), a crest factor reduction (CFR), a digital to analog converter (DAC), a power amplifier (PA), and the like. The signal transceiver channel may further include another entity functional module. For example, the filter provided in this application may be further disposed after the power amplifier. The antenna system 63, also referred to as an antenna feeder system, refers to an antenna and feeder system. The antenna and feeder system includes at least one antenna unit. The antenna unit includes a phase shifter and an antenna. An input end of a signal transceiver channel is connected to the baseband unit 61, and an output end of the signal transceiver channel is connected to at least one antenna unit, where the output end of the signal transceiver channel is connected to the antenna through the phase shifter. A phase control signal of the phase shifter is provided by the radio frequency unit 62, and the phase control signal of the phase shifter controls a phase shift state of the phase shifter, to control phase distribution of an electromagnetic wave on an aperture of a corresponding antenna, thereby implementing switching of antenna beams.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughout the specification does not necessarily mean a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

The filter, the phase shifter, and the related apparatus provided in this application are described in detail above. The specific implementations of this application are described herein by using specific examples. The descriptions of the foregoing embodiments are merely provided to help understand the methods and core ideas of this application. In addition, a person of ordinary skill in the art can make modifications to the specific implementations and application scopes according to the ideas of this application. In conclusion, content of this specification shall not be construed as a limitation on this application.

What is claimed is:

1. A filter comprising: a cavity, a circuit board, and a filter branch, wherein the circuit board is located in the cavity;

a power divider circuit is disposed on the circuit board, and the power divider circuit comprises an input end, a main feeder, and an output end, wherein both the input end and the output end are electrically connected to the main feeder, and the main feeder is configured to transmit a signal that is input at the input end and is output at the output end;

the filter branch comprises a first interface and a first filter line, wherein the first interface is disposed at an opening of the cavity, the first filter line is located outside the cavity, the first filter line is electrically connected to the first interface, and the first interface is electrically connected to the main feeder;

wherein the first filter line is electrically connected to the first interface in a screwing mode; and wherein the first filter line is in an open-circuit state in which one end of the first filter line is connected to the first interface and an other end of the first filter line is not connected to any circuit, and wherein a length of the first filter line is adjustable outside the cavity to adjust a wavelength range of an electromagnetic wave filtered out by the filter branch.

2. The filter according to claim 1, wherein the first filter line is electrically connected to the first interface in a coupling mode.

3. The filter according to claim 2, wherein the first filter line is a coaxial cable or a metal strip line.

4. The filter according to claim 1, wherein the filter branch further comprises a second filter line, which is located in the cavity and is disposed on the circuit board; and the first interface is connected to the main feeder through the second filter line.

5. The filter according to claim 4, wherein a total length of the first filter line and the second filter line ranges from 1/16 to 3/4 of a wavelength, and the wavelength is a wavelength of the electromagnetic wave filtered out by the filter branch.

6. The filter according to claim 1, wherein the circuit board comprises a metal strip line, wherein the metal strip line is exposed to air; or the metal strip line is a metal layer electroplated on a surface of a substrate; or the metal strip line is a metal layer embedded on the surface of the substrate which is plastic or ceramic.

7. The filter according to claim 6, wherein at least one buckle is disposed in the cavity;

at least one through hole is disposed in the circuit board, and the at least one through hole limits the at least one buckle; and the circuit board is fastened in the cavity through cooperation between the at least one through hole and the at least one buckle.

8. The filter according to claim 7, wherein a first end cover and a second end cover are respectively disposed at two opposite ends of the cavity;

a first slot and a second slot are respectively disposed at two ends that are of the circuit board and that correspond to the cavity, wherein the first slot limits the first end cover, and the second slot limits the second end cover; and the circuit board is fastened in the cavity through cooperation between the first slot and the first end cover and cooperation between the second slot and the second end cover.

9. The filter according to claim 8, further comprising a fastener;

the fastener is perpendicular to the circuit board; and two ends of the fastener are connected to the cavity in a vertical direction relative to the circuit board, and the fastener is configured to limit the circuit board in the vertical direction relative to the circuit board.

10. A phase shifter, comprising a filter, wherein the filter comprises: a cavity, a circuit board, and a filter branch;

the circuit board is located in the cavity;

a power divider circuit is disposed on the circuit board, and the power divider circuit comprises an input end, a main feeder, and an output end, wherein both the input end and the output end are electrically connected to the main feeder, and the main feeder is configured to transmit a signal that is input at the input end and is output at the output end;

the filter branch comprises a first interface and a first filter line, wherein the first interface is disposed at an opening of the cavity, the first filter line is located outside the cavity, the first filter line is electrically connected to the first interface, and the first interface is electrically connected to the main feeder;

wherein the phase shifter further comprises a phase shift unit;

the phase shift unit is located in the cavity, and the phase shift unit moves relative to the circuit board;

wherein the first filter line is electrically connected to the first interface in a screwing mode; and wherein the first filter line is in an open-circuit state in which one end of the first filter line is connected to the first interface and an other end of the first filter line is not connected to any circuit, and wherein a length of the first filter line is adjustable outside the cavity to adjust a wavelength range of an electromagnetic wave filtered out by the filter branch.

11. The phase shifter according to claim 10, wherein the phase shift unit comprises a mobile circuit board, which is disposed in parallel on a side of the circuit board, and is coupled and electrically connected to the circuit board.

12. An antenna comprising:

an antenna unit, configured to radiate an electromagnetic beam, and a phase shifter that is connected to the antenna unit; wherein the phase shifter comprises a filter, wherein the filter comprises: a cavity, a circuit board, and a filter branch;

the circuit board is located in the cavity;

a power divider circuit is disposed on the circuit board, and the power divider circuit comprises an input end, a main feeder, and an output end, wherein both the input end and the output end are electrically connected to the main feeder, and the main feeder is configured to transmit a signal that is input at the input end and is output at the output end;

the filter branch comprises a first interface and a first filter line, wherein the first interface is disposed at an opening of the cavity, the first filter line is located outside the cavity, the first filter line is electrically connected to the first interface, and the first interface is electrically connected to the main feeder;

wherein the phase shifter further comprises a phase shift unit;

the phase shift unit is located in the cavity, and the phase shift unit can move relative to the circuit board;

wherein the first filter line is electrically connected to the first interface in a screwing mode; and wherein the first filter line is in an open-circuit state in which one end of the first filter line is connected to the first interface and an other end of the first filter line is not connected to any circuit, and wherein a length of the first filter line is adjustable outside the cavity to adjust a wavelength range of an electromagnetic wave filtered out by the filter branch.

13. The antenna according to claim 12, wherein the phase shift unit comprises a mobile circuit board, which is disposed in parallel on a side of the circuit board, and is coupled and electrically connected to the circuit board.

14. The antenna according to claim 12, wherein the first filter line is electrically connected to the first interface in a coupling mode.

15. The antenna according to claim 14, wherein the first filter line is a coaxial cable or a metal strip line.

16. The antenna according to claim 12, wherein the filter branch further comprises a second filter line, which is located in the cavity and is disposed on the circuit board; and the first interface is connected to the main feeder through the second filter line.

17. A base station device, comprising an antenna, wherein the antenna comprises:

an antenna unit, configured to radiate an electromagnetic beam, a phase shifter that is connected to the antenna unit; wherein the phase shifter comprises a filter, wherein the filter comprises: a cavity, a circuit board, and a filter branch;

the circuit board is located in the cavity;

a power divider circuit is disposed on the circuit board, and the power divider circuit comprises an input end, a main feeder, and an output end, wherein both the input end and the output end are electrically connected to the main feeder, and the main feeder is configured to transmit a signal that is input at the input end and is output at the output end;

the filter branch comprises a first interface and a first filter line, wherein the first interface is disposed at an opening of the cavity, the first filter line is located outside the cavity, the first filter line is electrically connected to the first interface, and the first interface is electrically connected to the main feeder;

wherein the phase shifter further comprises a phase shift unit;

the phase shift unit is located in the cavity, and the phase shift unit moves relative to the circuit board;

wherein the first filter line is electrically connected to the first interface in a screwing mode; and wherein the first filter line is in an open-circuit state in which one end of the first filter line is connected to the first interface and an other end of the first filter line is not connected to any circuit, and wherein a length of the first filter line is adjustable outside the cavity to adjust a wavelength range of an electromagnetic wave filtered out by the filter branch.

18. The base station device according to claim 17, wherein the phase shift unit comprises a mobile circuit board, which is disposed in parallel on a side of the circuit board, and is coupled and electrically connected to the circuit board.

19. The base station device according to claim 17, wherein the first filter line is electrically connected to the first interface in a coupling mode.

20. The base station device according to claim 19, wherein the first filter line is a coaxial cable or a metal strip line.

* * * * *